Feb. 26, 1963  H. M. JERNIGAN  3,078,980
FULLY RESILIENT TROUGHING IDLER ASSEMBLY
FOR LOW ROPE CONVEYOR
Filed Sept. 29, 1959  2 Sheets-Sheet 1

INVENTOR.
Howard M. Jernigan
BY Parker & Carter
Attorneys.

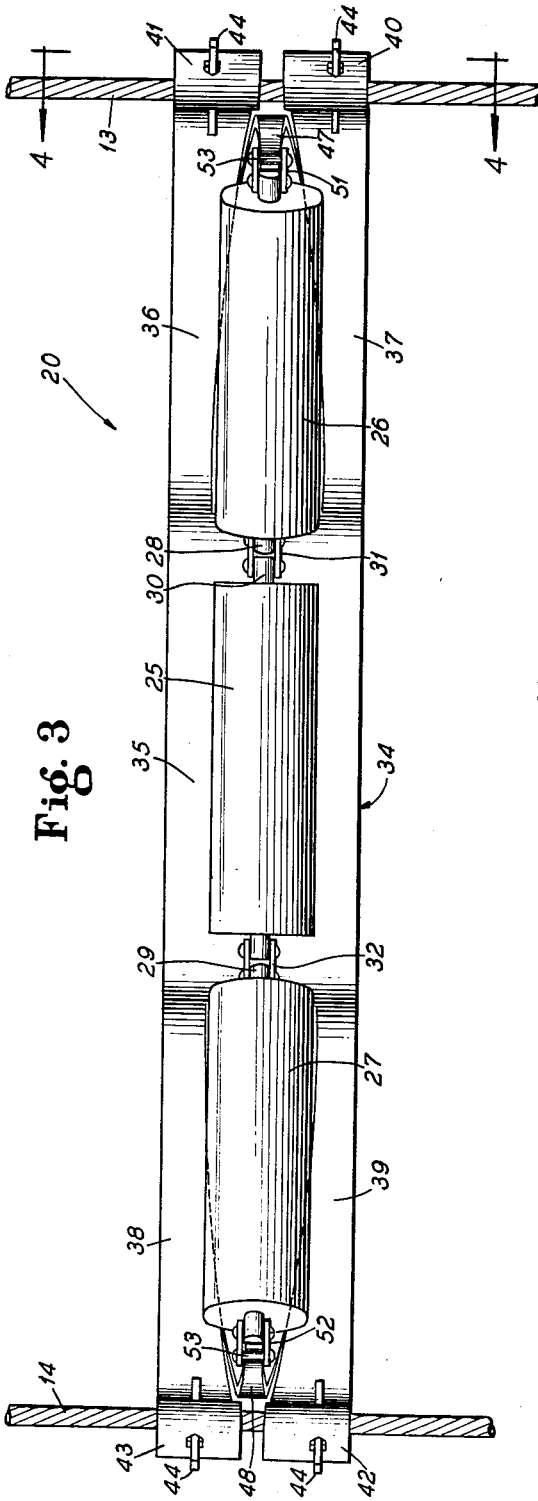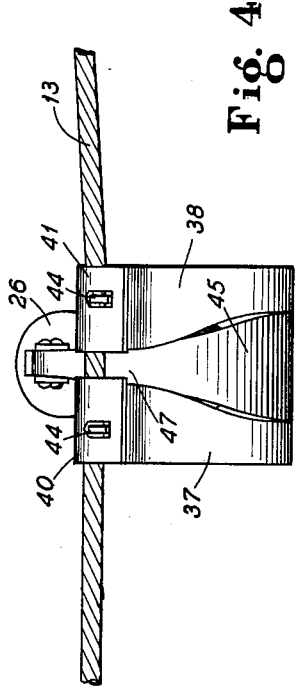

United States Patent Office 3,078,980
Patented Feb. 26, 1963

3,078,980
FULLY RESILIENT TROUGHING IDLER ASSEMBLY FOR LOW ROPE CONVEYOR
Howard M. Jernigan, Beckley, W. Va., assignor to Goodman Manufacturing Company, Chicago, Ill., a corporation of Illinois
Filed Sept. 29, 1959, Ser. No. 843,213
5 Claims. (Cl. 198—192)

This invention relates generally to flexible strand conveyors and particularly to a troughing idler assembly for such conveyors especially adapted for use in low rope installations.

Flexible strand conveyors of the type illustrated in the Craggs et al. Patent No. 2,773,257 are coming into increasingly widespread use due to their many inherent and desirable features. They are relatively inexpensive, require little maintenance and have extremely high carrying capacities.

These conveyors generally comprise a pair of flexible strands, such as wire ropes, trained along a conveying course, such as a mine run. The strands are supported at spaced intervals by suitable means such as ground support stands or roof hangers. A plurality of troughing idler assemblies are suspended from the stands at spaced intervals to form a bed for the conveying reach of a flexible conveyor belt. These troughing idler assemblies generally comprise a plurality of interconnected rollers which may be fixed or free to flex vertically, horizontally, or both vertically and horizontally with respect to one another. In some installations, the interconnected rollers are suspended directly from the flexible strands whereas in others, a frame assembly carrying the rollers is suspended from the strands. A plurality of return roller assemblies, which may be hung from the flexible strands or carried by other supporting structure, are spaced at intervals directly beneath the troughing idler assemblies to form a bed for the return reach of the conveyor belt. The makeup of the return roller assemblies varies widely, but a convenient structure consists of an elongated roller journaled in brackets fixed to the support stands. Since the return reach of the belt carries no load, the return roller assemblies are usually spaced at substantially greater distances than the conveying reach.

Many structural variations of troughing idler assemblies have been evolved to meet specific needs in specific industries. While it is practically impossible to accurately classify the variant structures, for purposes of further description they may be divided into two broad categories; namely, flexible assemblies and cradled assemblies.

One of the simplest types of flexible assemblies is illustrated in the Craggs et al. patent. The troughing idler assembly there shown consists merely of three rollers connected for flexure in a vertical plane with respect to one another. The outer ends of the wing or flanking rollers are connected directly to the flexible strands. As a load approaches, the rollers flex with respect to one another to form a gradually deepening trough which optimizes the carrying capacity of the conveyor belt. This type of idler assembly has a very large carrying capacity because of this high degree of flexibility which in effect lets the belt curl around the load. For installations having ample head room, this type of roller assembly is widely used. The supporting structure for the flexible strands is so dimensioned so as to maintain adequate vertical clearance between the bottom of the roller assembly and the top of the return reach of the conveyor belt when the rollers assume their deepest troughing contour.

It should be understood that the bodily generally downward displacement of the idler assembly is actually the result of a plurality of additive displacement effects. Because of the play in the flexible strands between adjacent supporting structures, the strands move downwardly and inwardly under the influence of load. The downward component of movement is of course due to the mass of the conveyed material, but the inward movement is due primarily to the shortening of the distance between the outer ends of the flanking rollers. The shortening effect is of course due to the troughing movement of the rollers with respect to one another.

The cradled idler assembly is a second broad type of troughing idler assembly. The rollers in this construction are carried in a frame structure which in turn is connected directly to the flexible strands. The frame structure may include members spanning all or a portion of the width of the conveyor and may be rigid or semi-rigid. A good example is illustrated in the McCallum Patent No. 2,851,151. The individual rollers are generally restrained from flexure vertically with respect to one another which results in a lessening of its inherent carrying capacity. This disadvantage however is often offset by the fact that since the troughing contour is maintained relatively uniform, the bodily downward displacement of the entire assembly is less than that of an equally loaded fully flexible idler assembly. This feature is of particular advantage in low clearance installations such as coal mines where height is always a problem. In effect, the cradled idler assembly places the entire load vertically on the flexible strands thereby minimizing inward deflection of the strands due to relative inward movement of the ends of the rollers. Although the cradled assembly has proven very useful in low clearance installations, its carrying capacity is not equal to that of the fully flexible assemblies.

Accordingly, the primary object of this invention is to provide a flexible strand conveyor troughing idler assembly for low clearance installations which embodies the best advantages of present systems, including the high carrying capacity of the fully flexible troughing idler assembly and the minimum bodily downward displacement of the cradled idler assembly.

Another object is to provide a troughing idler assembly for low rope installations which minimizes inward deflection of the flexible strands and thereby imposes the load on the flexible strands in a vertical direction.

Yet another object is to provide a flexible strand conveyor troughing idler assembly for low rope applications which minimizes shocks and vibrations in the system, particularly when the belt runs loaded.

Yet a further object is to provide a resilient flexible strand conveyor troughing idler assembly having a high carrying capacity particularly adapted for low rope applications.

Yet another object is to provide an idler assembly for low seam installations which is extremely easy to install and replace.

Other objects and advantages of the invention will become apparent from the following description taken in connection with the accompanying drawings wherein by way of illustration and example certain embodiments of the invention are set forth.

The invention is illustrated more or less diagrammatically in the accompanying drawings, wherein:

FIGURE 3 is a view taken substantially on the line 3—3 of FIGURE 2; and

FIGURE 4 is a view taken substantially on the line 4—4 of FIGURE 3.

Like reference numerals will be used to refer to like parts throughout the specification and drawings.

Figure 2:
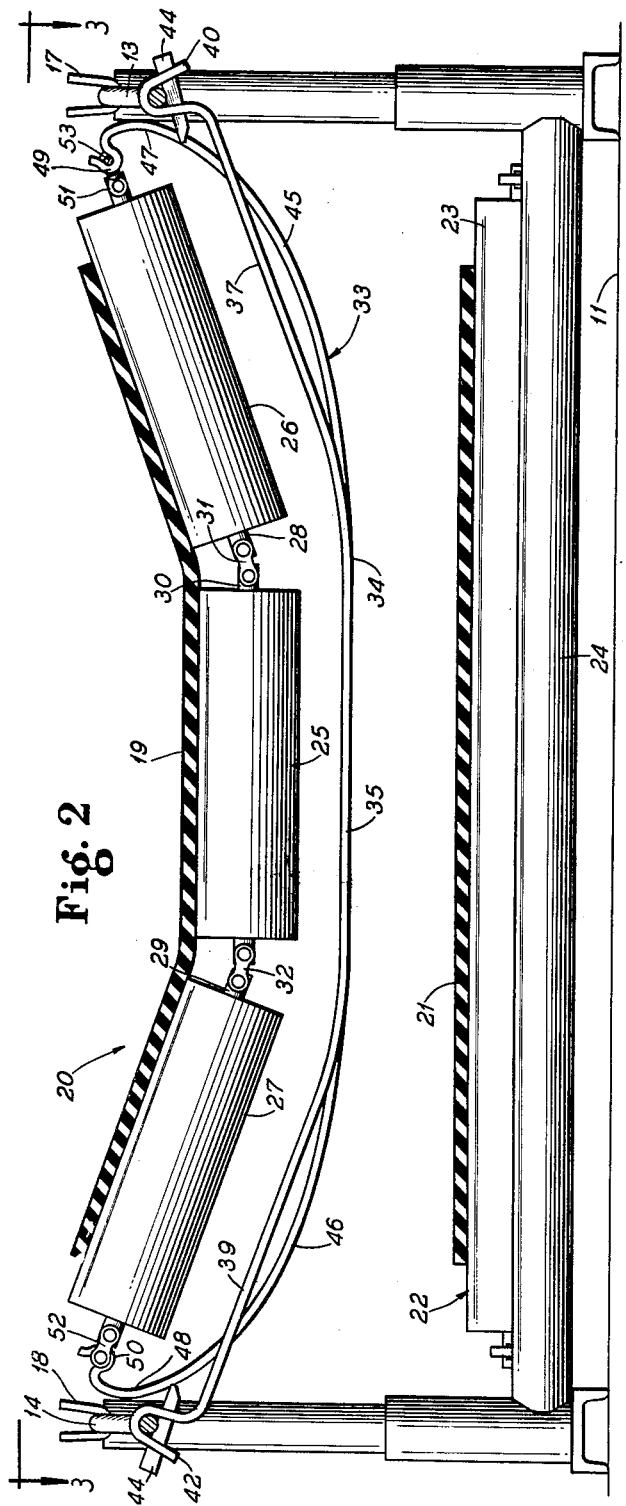
FIGURE 2 is a section through the conveyor of FIGURE 1 taken substantially on the line 2—2 of FIGURE 1.
Figure 1:
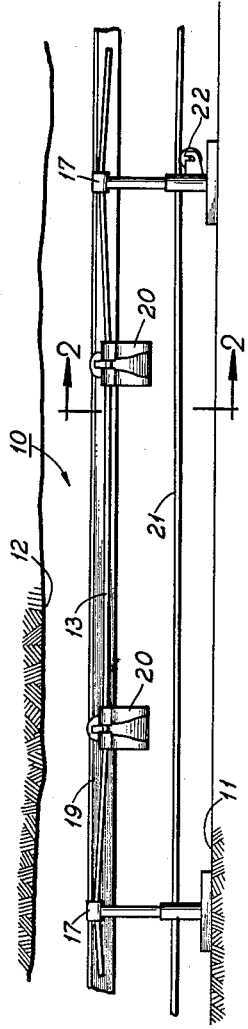
FIGURE 1 is a side elevational view of a portion of a flexible strand conveyor embodying the present invention.

In FIGURES 1 and 2, a flexible strand conveyor is illustrated generally at 10 resting on the ground 11 which may be the floor of a mine or the like. In this instance the conveyor is illustrated as positioned in a coal mine having a relatively low clearance between the floor 11 and roof 12. The conveyor 10 consists essentially of a pair of flexible strands 13 and 14 trained in generally parallel relationship along the conveying course and supported at spaced intervals by supporting structures. In this instance the supporting structures are telescoping stands resting on the ground 11. Since the details of the stands do not of themselves form a part of the invention they are not further illustrated or described. A pair of U-shaped saddle members 17 and 18 are welded to the top of the telescoping stands to form a seat for the flexible strands. The conveying reach 19 of a flexible conveyor belt is supported on a bed formed by a plurality of idler assemblies 20 located at intervals along the strands. The return reach 21 of the belt is similarly supported at intervals by return roller assemblies 22 which include an elongated return roller 23 carried by brackets welded to the support stands. Any suitable strut or brace 24 positions the stands a fixed distance apart to thereby maintain a uniform flexible strand gauge along the length of the conveyor.

The unique idler assembly of the present invention is illustrated best in FIGURES 2, 3 and 4. It includes a roller assembly having a center primary load carrying roller 25 flanked by a pair of end or wing rollers 26 and 27. The inner ends of the wing roller shafts 28, 29 are flexibly connected to center roller shaft 30 by links 31, 32 which permit flexure of the center and wing rollers in a vertical plane with respect to one another.

A frame assembly for supporting the interconnected rollers is indicated generally at 33. The assembly in this instance includes an elongated frame member 34, or perhaps more accurately, a resilient frame supporting member, having a flat mid portion 35 and terminal end tension members 36, 37 and 38, 39. The end tension members 36—39 are substantially flat and terminate in inverted U-shaped strand seating members 40, 41 and 42, 43. The seating members form means for connecting the entire assembly to the flexible strands 13 and 14. Suitable wedges 44 passing through aligned apertures in the legs of the U-shaped seating members force the flexible strands into snug engagement therewith.

A pair of inclined roller assembly supporting arms 45, 46 extend upwardly from the elongated main frame member 34 and outwardly with respect to its mid-portion 35. In this instance, the supporting arms have been formed integrally from the elongated frame member by a cutting operation, but the arms could be formed as separate pieces and secured to the elongated frame member. In any event, their contour should run into the mid-portion 35 of the elongated frame member to prevent concentration of stresses in the junction area. In this instance, the inner ends of the arms form a tangent at their point of junction. The upper ends of the roller supporting arms are curved at an increasing angle outwardly and terminate in reverse S-curved portions 47 and 48 which form seats 49, 50. Links 51, 52 pivotally connected to the outer ends of the wing roller shafts and to pivot pins 53 resting in the seats 49, 50 suspend the roller assembly from the frame assembly 33.

The use and operation of the invention is as follows:

It is highly desirable in low seam operations, particularly in coal mines, to utilize a troughing idler assembly in which the rollers are free to flex vertically with respect to one another. The flexing movement of the rollers forms a trough which provides the greatest carrying capacity. At the same time, it is highly desirable that the bodily downward displacement of the idler assembly, and particularly the center roller, be kept at a minimum so that contact between it and the return reach of the conveyor belt is avoided.

The illustrated structure provides a high degree of troughing idler assembly roller flexibility while reducing the bodily downward displacement of the assembly to a minimum. The interconnected rollers are joined by end links 51, 52 to the inclined roller supporting arms or middle tension members 45, 46 of the elongated frame assembly 33. Since the ends of the middle tension members are in effect the ends of a leaf spring, it is a simple matter to bend them inwardly sufficiently far to slip the pivot pins 53 into the seats 49, 50. As a load on the conveying reach 19 of the belt approaches the idler assembly, the individual rollers 25, 26, 27 flex with respect to one another in a vertical plane since they are pivotally connected by the links 31, 32. As the center roller 25 moves downwardly, the outer ends of the wing roller shafts 28, 29 will move inwardly carrying with them the ends of the middle tension members 45, 46. This movement is equivalent to the fully flexible troughing movement of the idler assembly illustrated in the Craggs et al. Patent No. 2,773,257. The flexible strands 13 and 14 will be substantially unaffected however except for downward movement due to the increased load. This is because inward movement of the ends of the wing rollers takes place independently of movement of the strands. In effect, the inwardly displaceable pivot pins 53 are substituted for the flexible strands 13 and 14.

The straight line contour of the end tension members 36—39 also aids in maintaining the relatively fixed strand spacing.

The frame assembly 33 provides a tension path from the roller assembly to the flexible strand through the roller supporting arms 45, 46, to the generally flat mid-portion 35, and outwardly through the end tension members 36, 37 and 38, 39. Specifically, as seen best in FIGURE 2, each roller supporting arm forms an acute angle with its adjacent end tension member. Because the tension paths between the free ends of the roller supporting arms and end tension members to the mid-portion 35 are substantially directly opposed, shock loads are substantially minimized. These loads may occur when an especially large lump hits the roller assembly. The natural spring in the middle tension members 45, 46 absorbs a portion of the shock, and much of the remainder is absorbed by the generally flat mid-portion 35 of the elongated frame member. By the time the shock load is transmitted to the flexible strands through the flanking tension members 36—39, it has been substantially reduced. In addition, the roller supporting arms and end tension members may flex in opposite directions simultaneously, thus canceling out one another.

As shown, the roller supporting arms 45, 46 form a tangent at their point of junction with the generally flat mid-portion 35 of the elongated frame member. This construction prevents stress concentration at the junctions resulting from the constantly varying loads.

The roller assembly will not flex quite as freely as a completely freely suspended troughing idler assembly due to the elastic spring limit in the roller supporting arms 45, 46, but the troughing movement is considerably greater than the fixed contours of the conventional cradle idler assembly. At the same time, inward movement of the flexible strands 13 and 14 is substantially prevented because the mid-portion 35 and end flanking tension members 36—39 form an elongated tension path which is substantially rigid. The middle tension members 45, 46 and pivot pins 53 in effect take up the inward movement of the roller assembly resulting from the troughing flexure of the individual rollers.

The foregoing description is illustrative only and not definitive. Accordingly, the invention should not be limited except by the scope of the following appended claims.

I claim:
1. A resilient troughing idler assembly for use in a belt conveyor, said resilient troughing idler assembly including, in combination,
a roller assembly comprising a plurality of interconnected rollers,
a resilient frame assembly for supporting the roller assembly, said resilient frame assembly including a resilient supporting member which includes at each end, a tension member, said pair of end tension members flanking a mid-portion of said resilient supporting member,
a pair of inclined, resilient roller assembly supporting members extending upwardly from the resilient supporting member, said inclined roller assembly supporting members being transversely yieldable with respect to the longitudinal axis of the belt conveyor,
means for connecting the roller assembly to the resilient roller assembly supporting members, and
means for connecting the resilient frame assembly, and thereby the roller assembly, to supporting structure of the belt conveyor.

2. The resilient troughing idler assembly of claim 1 further characterized in that the inclined roller assembly supporting members are disposed generally tangentially to the resilient supporting member at their point of intersection therewith.

3. The resilient troughing idler assembly of claim 2 further characterized in that the outer ends of the end tension members are connected to the roller assembly, and the inner ends to the resilient supporting member whereby the tension path from each end of the roller assembly to the adjacent conveyor support structure through the associated inclined roller assembly supporting member and end tension member forms an acute angle.

4. The resilient troughing idler assembly of claim 1 further characterized in that the rollers are flexibly interconnected with one another in a vertical plane.

5. A resilient frame assembly for suspending a roller assembly from the supporting structure of a belt conveyor, said resilient frame assembly including, in combination, a generally flat main frame member substantially longer than it is wide and substantially wider than it is thick, said main frame member having a length approximating the gauge of the conveyor supporting structure to which it is adapted to be secured, said main frame member being resilient and having a flat, generally horizontally oriented mid-portion and a pair of upwardly, outwardly extending, generally arcuately formed inclined resilient roller assembly supporting arms, said arms being generally tangentially disposed to the resilient main frame member at their junction therewith, said arms carrying, adjacent their outer ends, means for supporting a roller assembly, and means carried by the resilient main frame member for connecting said resilient main frame member to the supporting structure of the belt conveyor.

References Cited in the file of this patent
UNITED STATES PATENTS

| | | |
|---|---|---|
| 2,781,124 | Troller | Feb. 12, 1957 |
| 2,876,890 | Baechli | Mar. 10, 1959 |
| 2,880,851 | Salmons | Apr. 7, 1959 |
| 2,904,166 | Stinson | Sept. 15, 1959 |
| 2,907,448 | Gleeson | Oct. 6, 1959 |